(12) United States Patent
Cavallo

(10) Patent No.: US 7,318,543 B2
(45) Date of Patent: Jan. 15, 2008

(54) APPARATUS FOR SEPARATING THE BEARING CAP OF A CONNECTING ROD BY FRACTURE

(75) Inventor: Giorgio Cavallo, Borgaro Torinese (IT)

(73) Assignee: Vigel S.p.A., Borgaro Torinese (IT)

( * ) Notice: Subject to any disclaimer, the term of this patent is extended or adjusted under 35 U.S.C. 154(b) by 0 days.

(21) Appl. No.: 11/334,493

(22) Filed: Jan. 19, 2006

(65) Prior Publication Data
US 2006/0175371 A1    Aug. 10, 2006

(30) Foreign Application Priority Data
Feb. 9, 2005 (EP) .................................. 05425058

(51) Int. Cl.
B26F 3/00    (2006.01)
(52) U.S. Cl. ...................... 225/103; 225/97; 29/888.09
(58) Field of Classification Search .................. 225/93, 225/97, 100, 101, 103–105; 29/888.09, 888.091, 29/888.092; 83/875
See application file for complete search history.

(56) References Cited

U.S. PATENT DOCUMENTS

| | | | |
|---|---|---|---|
| 5,699,947 A * | 12/1997 | Cavallo et al. | 225/101 |
| 6,379,754 B1 * | 4/2002 | Schlegel et al. | 427/446 |
| 6,536,642 B1 * | 3/2003 | Cavallo et al. | 225/101 |
| 6,571,999 B2 * | 6/2003 | Hase | 225/1 |
| 2002/0042992 A1 * | 4/2002 | Rivard et al. | 29/888.09 |
| 2002/0070257 A1 | 6/2002 | Hahnel et al. | |
| 2002/0158099 A1 * | 10/2002 | Matsuoka et al. | 225/96.5 |
| 2005/0011925 A1 | 1/2005 | Momose et al. | |
| 2005/0016350 A1 * | 1/2005 | Momose et al. | 83/875 |
| 2005/0172484 A1 * | 8/2005 | Hase | 29/888.09 |

FOREIGN PATENT DOCUMENTS

DE    44 06 981 A1    9/1994

\* cited by examiner

*Primary Examiner*—Boyer D. Ashley
*Assistant Examiner*—Laura M. Lee
(74) *Attorney, Agent, or Firm*—Modiano & Associati; Albert Josif; Daniel J. O'Bryne

(57) ABSTRACT

The apparatus includes a frame supporting two fixtures, of which at least one is movable, and which have respective crescents adapted to be brought together to form a circular profile engageable with the big end of a connecting rod and separable by an opening device for fracturing the big end of the connecting rod. The opening device comprises a pusher device which has a sloping surface and is slidably supported with respect to one of the crescents to abut against the other crescent, and a driving member, which is slidable transversely to the pusher device under control of driving elements, and has a sloping surface that is adapted to cooperate with a camming action with the sloping surface of the pusher device.

4 Claims, 3 Drawing Sheets

APPARATUS FOR SEPARATING THE BEARING CAP OF A CONNECTING ROD BY FRACTURE

This invention relates to an apparatus for separating the bearing cap of a connecting rod by fracture.

BACKGROUND OF THE INVENTION

Separation of the bearing cap from the body of the rod by fracture has been known for several years. More particularly, prior U.S. Pat. No. 6,536,642 describes an automated apparatus for implementing the separation of the bearing cap from the body of a connecting rod, with subsequent remating and screwing of the union bolts. Such apparatus is suitable both for rods having an orthogonal cracking plane and for rods having a cracking plane that is askew to the body of the rod. With reference to the apparatus described in the above patent, the big end of the connecting rod, which is to be cracked, is engaged by two crescents that are operable to radially move away from each other by a piston, which is sealingly slidable within a radial chamber made in one of the crescents, and is driven by a hydraulic cylinder via a hydraulic pressure multiplier.

The above device, having a hydraulically operated piston, allows the connecting rods to be cracked with satisfactory accuracy and repeatability, in a way that minimizes deformation of the workpiece caused by yield stress. However, the biasing action of the piston in said prior document is applied to the connecting rod in a way that is partially asymmetrical so that, also in consideration of the unavoidable wear over time, the above, known apparatus is frequently subjected to malfunctions and requires replacements.

SUMMARY OF THE INVENTION

The above and other objects and advantages, such as will better appear from the following disclosure, are achieved by an apparatus having the features set out in claim 1, while the other claims state other advantageous features of the invention.

BRIEF DESCRIPTION OF THE DRAWINGS

The invention will be now described in more detail with reference to a preferred, non-exclusive embodiment shown by way of non-limiting example in the attached drawings, wherein.

DESCRIPTION OF THE PREFERRED EMBODIMENTS

Figure 1:
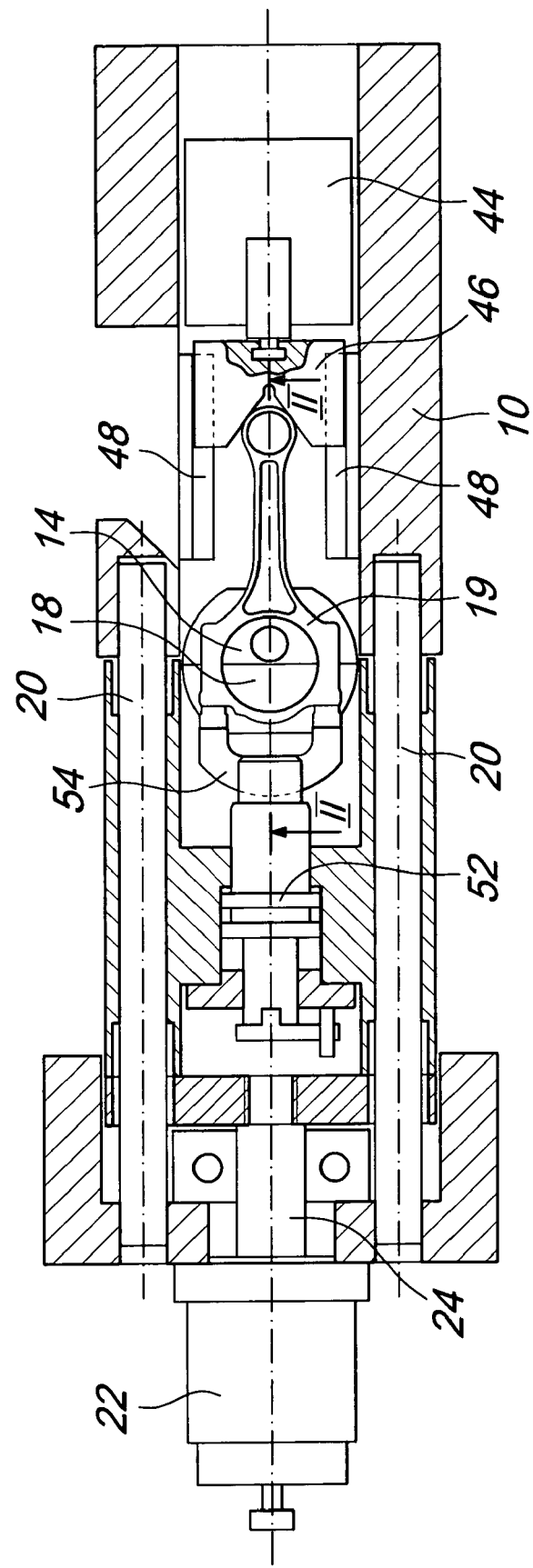
FIG. 1 is a plan, broken-away view of the apparatus for separating the bearing cap of a connecting rod by fracture according to the invention.

With reference to the above Figures, the apparatus of the invention comprises a frame 10 on which is integrally supported a stationary fixture 12 comprising a massive body extending upwardly to form a stationary, semicircular crescent 14, and a movable fixture 16, also comprising a massive body extending upwardly to form a movable, semicircular crescent 18. The two crescents are arranged in mirror positions with respect to their flat sides, and at right angles to the direction of motion of the movable fixture, so that a circular profile is generated, which is engaged by the big end of the piston rod. Movable fixture 16 is slidable along horizontal guides 20 which are integral with frame 10, and is driven by a hydraulic actuator 22 mounted on frame 10, through a rod 24. Hydraulic actuator 22 has the main task of bringing back together the movable crescent to the stationary crescent after fracturing the cap, as well as other accessory tasks as explained below.

Figure 2:
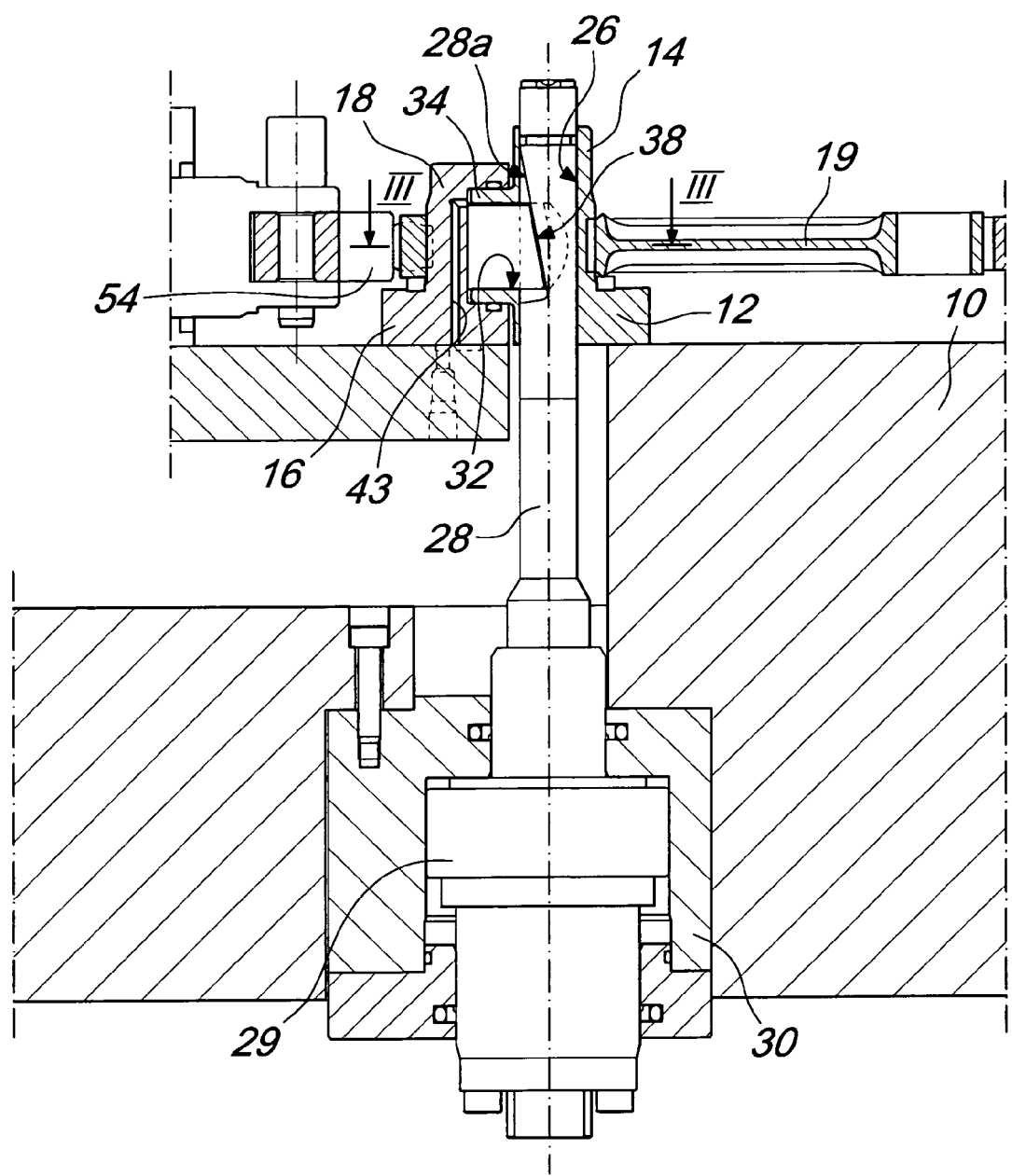
FIG. 2 is a cross-section view along line II-II of the apparatus of FIG. 1.
Figure 3:
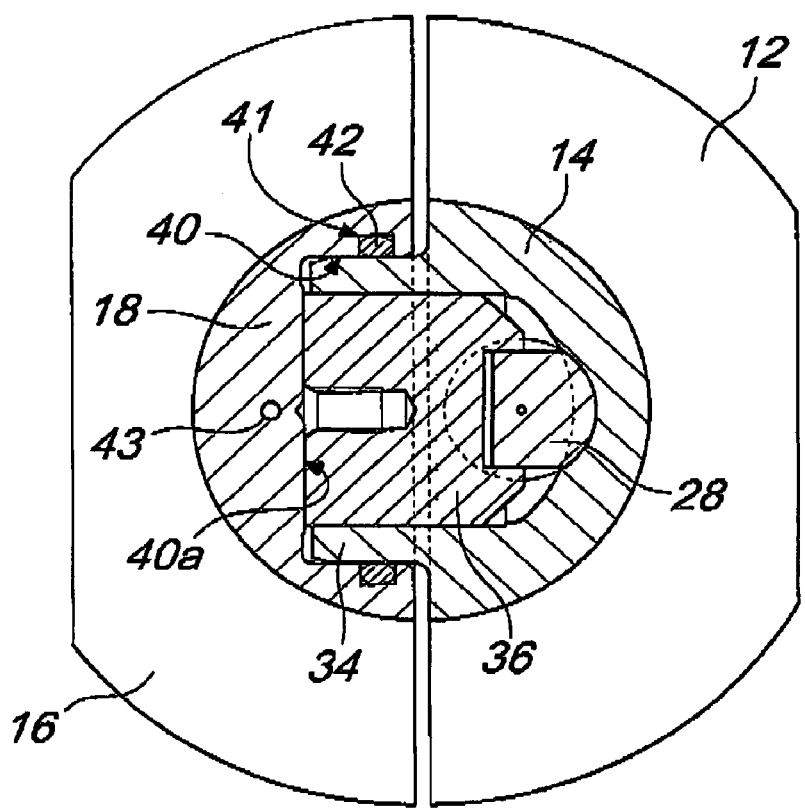
FIG. 3 is a cross-section view along line III-III of a detail of the apparatus of FIG. 2, in which the connecting rod has been removed for better clarity of illustration.

Having now more particular reference to FIGS. 2 and 3, stationary crescent 14 has a longitudinal hole 26 in which is slidingly received the end portion of a bar 28 that is operatively connected to a piston 29 of a hydraulic cylinder 30 that is incorporated in frame 10. A sloping surface 28a is defined on the outer skirt of the bar, which has positive slope in the direction of the free end of the bar, with respect to the longitudinal axis of the bar. The flat side of stationary crescent 14 has a sleeve 34 that projects in cantilever fashion and that has a cylindrical chamber 32 defined therein, open to longitudinal hole 26 and in which is slidably received a pusher device in form of a piston 36. The outer end of piston 36 is adapted to abut against movable crescent 18, while a sloping surface 38 on the opposite, inner end of piston 36 is adapted to cooperate with a camming action with sloping surface 28a of bar 28, which acts as driving member, thereby forming a mechanical device for expanding or prying open the crescents.

Sleeve 34 is received in a corresponding cylindrical cavity 40 bored in movable crescent 18, the movable crescent 18 being in relative slidable relation with the sleeve 34. An inner wall 40a of the movable crescent 18 forms the abutment area for piston 36. An annular gasket 42 is received in an annular groove 41 provided in movable crescent 18 and sealingly engages the outer skirt of sleeve 34. A lubricating channel 43, open to cylindrical cavity 40, is provided in movable fixture 16 and is connected to mean for feeding lubricating fluid (not shown).

Frame 10 also supports a first locking device comprising a hydraulic actuator 44 which controls a V-shaped block 46 slidable along guides 48, and is arranged for pressing on the little end of connecting rod 19 and therefore to lock the rod body against the stationary crescent.

Movable fixture 16 carries a second locking device, also comprising a hydraulic actuator 52 arranged for pressing both ends of a pivoting rocker 54 against the bolt seats on the bearing cap of the connecting rod, so that it is locked against the movable crescent.

In operation, while crescents 14 and 18 are close to each other and bar 28 is positioned in its outer position, connecting rod 19 is pushed around the crescents by positioning means (not shown) which are known from the above prior U.S. Pat. No. 6,536,642. Actuator 52 is then operated to press rocker 54 against the bearing cap, and a moderate pressure is applied to hydraulic actuator 22, in order to lock the big end of the connecting rod. Actuator 44 is also driven to engage V-shaped block 46 on the little end. Both the body and the bearing cap of the connecting rod are therefore locked independently from each other, respectively between block 46 and stationary crescent 12, and between movable crescent 16 and rocker 54.

The pressure in cylinder 30 is now increased, so that the resisting sections between the cap and the body of the connecting rod are pre-tensioned up to a load slightly lower than the yield stress. Hydraulic cylinder 30 is now operated to withdraw bar 28, thereby causing piston 36 to move outwardly by mutual engagement between the sloping surfaces of the piston and the bar respectively. Therefore, the movable crescent is quickly moved away from the stationary crescent and the cap's breaking stress is rapidly exceeded, so that the bearing cap is separated from the body of the connecting rod. This causes an instantaneous, fragile fracture, simultaneous on both surfaces. The two portions of the connecting rods each remain firmly held in the respective clamps, as explained above. During this step, actuator 22 is pressurized in its backward chamber, while the forward chamber is depressurized. The clamps formed by V-shaped block 46 and by rocker 54 are then released, so that connecting rod 19 is freed.

As will be understood by a person skilled in the art, the downwardly directed, radial component of the force applied to piston 36 by bar 28, due to the friction between their respective, mutually sliding, sloping surfaces, is reacted by sleeve 34 via the piston. Due to this advantageous feature, the force applied to movable fixture 16 by piston 36 has no radial components. In contrast, if such radial components were not neutralized as described above, they would be applied by friction to movable fixture 16, thereby causing the crescents to misalign from each other while prying open and therefore affecting the accuracy and regularity of the fracture.

In order to have a braking action to the travel of the movable fixture when the peak of fracturing pressure is applied, a moderate pressure is applied to the back chamber of actuator 22, such that it will not affect the quickness of the fracture, but such that it will present a braking resistance to the travel of the movable crescent after it has been freed by the fracture. Alternatively, in order to improve the durability of the device, actuator 22 may also be used to contribute to the fracturing force, by pressurizing its forward chamber with a higher pressure than its backward chamber.

Of course, may changes can be made to the preferred embodiment as described above, within the teachings of the invention. Particularly, in case of connecting rods where the fracturing plane is required to be oblique rather than at right angles to the rod body, the apparatus can be modified similarly to what has been described in the above prior U.S. Pat. No. 6,536,642, by replacing V-shaped block 46 with a profiled block gauged for pressing with a balanced pressure on the side of the connecting rod. Similarly, V-shaped block 46 can also be replaced by an U-shaped block having two elongated arms straddling the rod body and abutting against opposite sides of the big end, as described in the above prior patent, in order to unload the rod body so that the elastic behavior of the body does not affect the dynamic system, avoiding possible undesirable effects. Moreover, as a way of braking the movable member, conventional stopper devices might be used, as known in the art, instead of a counter-pressure in actuator 22. Further, although the arrangement where the connecting rod is horizontal and is loaded from above, according to the embodiments disclosed above, is preferable for ease of loading and unloading of the workpiece and also for ease of disposal of the chips and dust, nevertheless the apparatus might be designed so that the connecting rod is vertical or inclined, or horizontal but loaded from below, with suitable changes in the devices, such as will be obvious for the person skilled in the art. Finally, other driving means rather than hydraulic cylinder 30 might be implemented for driving bar 28, such as, e.g., mechanical actuators.

The disclosures in European Patent Application No. 05425058.4 from which this application claims priority are incorporated herein by reference.

What is claimed is:

1. An apparatus for separating the bearing cap of a connecting rod by fracture, comprising a frame supporting a movable fixture and a stationary fixture, and which have respective crescents adapted to be brought together to form a circular profile engageable with the big end of a connecting rod and separable by an opening device for fracturing the big end of the connecting rod, wherein said opening device comprises a piston, which is slidably received within a cylindrical chamber made in one stationary crescent of said stationary fixture and has one end adapted to abut against the movable fixture and one opposite end provided with a sloping surface, and a driving member, which is slidable transversely to the piston under control of driving means, and has a sloping surface that is adapted to cooperate with a camming action with the sloping surface of the piston, and wherein a sleeve of the stationary crescent projects in cantilever fashion and is received within a corresponding cylindrical cavity of a movable crescent of the movable fixture and that is bored in the movable crescent, the piston being adapted to abut against an inner wall of the movable crescent.

2. The apparatus of claim 1, wherein said driving member consists of a bar that is slidingly received in a hale that is made in the stationary fixture and is open to cylindrical chamber, said sloping surface being made on the outer skirt of the bar in front of the cylindrical chamber for engaging the sloping surface of the piston with a camming action.

3. The apparatus of claim 1, wherein a lubricating channel open to the cylindrical cavity is provided in the movable fixture and is connected to means for feeding lubricating fluid.

4. The apparatus of claim 1, wherein said driving means consist of a hydraulic cylinder.

* * * * *